US006857889B1

(12) United States Patent
Vitale

(10) Patent No.: US 6,857,889 B1
(45) Date of Patent: Feb. 22, 2005

(54) VEHICLE BODY TO CHASSIS CONNECTION AND METHOD

(75) Inventor: Robert Louis Vitale, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/673,067

(22) Filed: Sep. 26, 2003

(51) Int. Cl.⁷ .................. H01R 11/22; H01R 33/00; H01R 4/50; H01R 13/625

(52) U.S. Cl. ............... 439/269.1; 439/34; 439/342; 439/266

(58) Field of Search ............... 439/258–270, 439/34, 342

(56) References Cited

U.S. PATENT DOCUMENTS

| | | | | |
|---|---|---|---|---|
| 4,478,472 A | * | 10/1984 | Baar | 439/296 |
| 4,842,538 A | * | 6/1989 | Noschese | 439/260 |
| 5,002,500 A | | 3/1991 | Zuccaro et al. | 439/348 |
| 5,058,016 A | | 10/1991 | Davidovitch | 364/424.01 |
| 5,609,495 A | * | 3/1997 | McHugh | 439/268 |
| 5,707,247 A | * | 1/1998 | Konstad | 439/342 |
| 6,071,138 A | * | 6/2000 | Walkup et al. | 439/266 |
| 6,299,473 B1 | | 10/2001 | Schwarz et al. | 439/404 |
| 6,325,655 B1 | * | 12/2001 | Noda et al. | 439/342 |
| 2002/0064987 A1 | | 5/2002 | Kimura | |
| 2003/0092304 A1 | | 5/2003 | Whyne et al. | |

* cited by examiner

Primary Examiner—Chandrika Prasad
(74) Attorney, Agent, or Firm—Kathryn A. Marra

(57) ABSTRACT

A connector assembly for communicating signals between a vehicle chassis and a matable vehicle body includes a first housing having a first contact mounted to one of the chassis and the body. A second housing is mounted to the other of the chassis or the body and is matable with the first housing upon mating of the chassis and the body. The second housing has a second contact that is operatively engageable with the first contact for communicating the signals. The first contact is insertable into the second housing after substantial mating of the first and second housings with an absence of insertion force upon the first contact. A method is provided for communicating signals between a vehicle chassis having a first housing and a matable vehicle body having a second housing matable with the first housing.

20 Claims, 4 Drawing Sheets

VEHICLE BODY TO CHASSIS CONNECTION AND METHOD

TECHNICAL FIELD

This invention relates to a vehicle body to chassis connection system.

BACKGROUND OF THE INVENTION

As described in copending application Ser. No. 10/207,734 filed Jul. 29, 2002 and assigned to General Motors Corp., which is herein incorporated by reference, a body connection system for connecting a vehicle body to a vehicle chassis may include an electrical connector disposed on the body that is automatically matable with a complementary electrical connector disposed on the chassis. Electrical signals may be communicated between the body and the chassis through the mated connectors. This design is especially advantageous in implementing by-wire control systems on vehicles, such as by-wire braking and by-wire steering, and thereby reducing mechanical linkages between the body and the chassis. As discussed in application Ser. No. 10/207,734, the mated connectors may be decoupled from one another in detaching the body from the chassis.

Because the connectors play a vital role in enabling functioning vehicle systems, it is desirable to protect the connectors from damage that may occur during repeated mating and decoupling.

SUMMARY OF THE INVENTION

A connector assembly for communicating signals between a vehicle chassis and a matable vehicle body includes a first housing mounted to one of the chassis and the body. The first housing has a first contact. The connector assembly also includes a second housing mounted to the other of the chassis and the body and matable with the first housing upon mating of the chassis and the body. The second housing has a second contact that is operatively engageable with the first contact for communicating the signals. The first contact is insertable into the second housing after substantial mating of the first and second housings with an absence of insertion force upon the first contact. Substantial mating may be defined as 70% to 100% of complete mating. Preferably, the first and second contacts are not operatively engaged upon insertion of the first contact into the second contact.

Preferably, the first contact is a pin having a circumference and an operative engagement is by contact between the circumference of the pin and the second contact.

The connector assembly may include a rotational mechanism that rotates a portion of one of the first and second housings to an engaged position. The first and second contacts are releasably engaged for communicating the signals upon such rotation. The rotational mechanism may include a locking feature for releasably locking the portion of one of the first and second housings in the engaged position.

The connector assembly may include a transport mechanism operatively connected to the first contact for translatably inserting the first contact into and retracting the first contact from the second housing. A force sensor may be operatively connected to the transport mechanism for signaling the transport mechanism to retract the first contact from the second housing during insertion thereof upon sensing a predetermined amount of force.

The connector assembly may include an alignment mechanism mounted to one of the first housing and the second housing for determining relative alignment of the first and the second housings for permitting mating of the first and second housings. The alignment mechanism may include a proximity sensor or an infrared sensor. The alignment mechanism may include a mechanical tab disposed on one of the first housing and the second housing and matable with a complementary receptacle located on the other of the first housing and the second housing.

The first and second housings may be formed with matable openings to form a pass-through for passing fluids between the body and the chassis.

The connector assembly may include a first flexible mount for mounting the first housing to one of the chassis and the body as well as a second flexible mount for mounting the second housing to the other of the chassis and the body. The mated housings are relatively movable with respect to the body and the chassis at the first and second flexible mounts.

The first housing may have a plurality of first contacts, the first contacts being pins. The pins may include a first type of pins and a second type of pins, the first type of pins being larger than the second type of pins. The first and second types of pins may be relatively located with respect to one another such that the first type of pins are located between the outer circumference of the first housing and the second type of pins for providing structural support to the connector assembly and for shielding the second type of pins from electromagnetic interference.

A method is provided for communicating signals between a vehicle and a chassis having a first housing and a matable vehicle body having a second housing. The method includes moving at least one of the chassis and the body towards the other, sensing the relative positions of the first and second housing and aligning the body and the chassis with one another based upon the sensed relative positions. The method further includes mating the first housing and the second housing with one another and translating a first contact from one of the housings into the other of the housings, wherein the translating is characterized by an absence of insertion force upon the first contact. The method further includes rotating the other housing to an engaged position such that the first contact operatively engages with a second contact in the other housing, thereby communicating the signals between the body and the chassis.

The method may further include releasably locking the other housing in the engaged position. The method may include validating communication circuits in the body and the chassis to ensure operative engagement of the first and second contacts with each other.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENT

Figure 1:
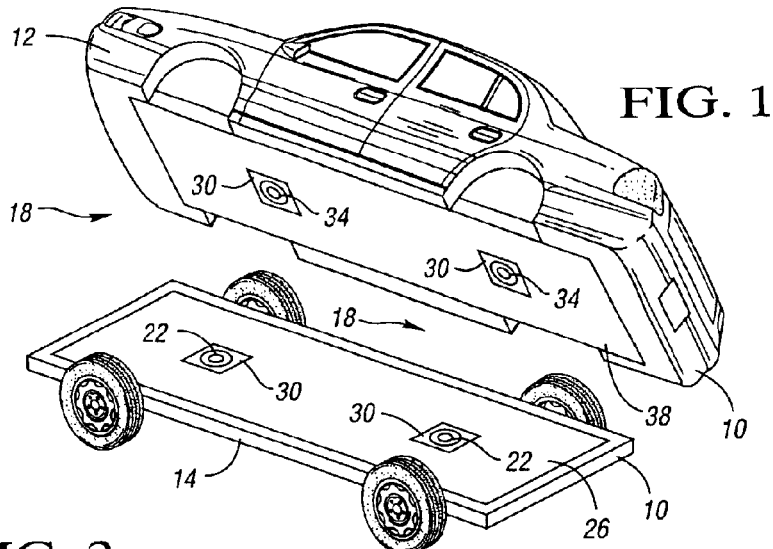
FIG. 1 is a perspective schematic view of a vehicle having a matable chassis and body and a matable first housing and second housing.

Referring to the drawings, wherein like reference numbers refer to like components, FIG. 1 shows a vehicle 10 having a vehicle body 12 and a matable vehicle chassis 14. Connector assemblies 18 are disposed toward the front and the rear of the vehicle. Preferably, the vehicle 10 includes two connector assemblies 18, one of which is redundant and is used only in the event of failure of the other. Each connector assembly 18 includes a first housing 22 mounted to an upper surface 26 of the chassis 14 at a flexible mounting flange 30. Each connector assembly 18 also includes a second housing 34 mounted to a lower surface 38 of the body 12, also at a flexible mounting flange 30. The first housing 22 is matable with the second housing 34 when the lower surface 38 of the body 12 is moved toward the upper surface 26 of the chassis 14.

Figure 2:
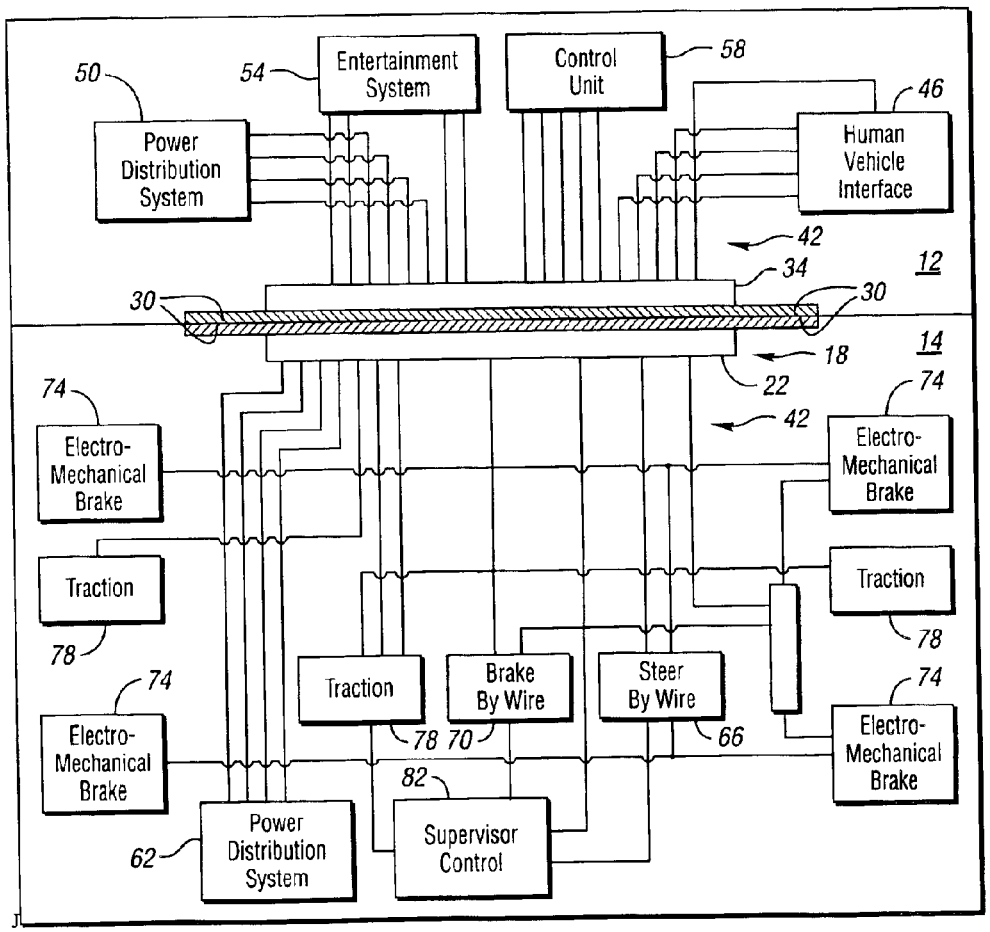
FIG. 2 is a schematic side view of communication components connected through the mated first and second housings of FIG. 1.

Referring to FIG. 2, the body 12 and the chassis 14 are shown mated. Such mating is accomplished, at least in part, by mating each first housing 22 with its paired second housing 34 in each connector assembly 18. (Other structural connector assemblies (not shown), having a first member disposed on the body and a matable second member disposed on the chassis structurally secure the body to the chassis upon mating. Such structural connectors are discussed in previously referenced application Ser. No. 10/207, 734.) A variety of communication signals 42 are routed from body-side communication components through the first and second housings 22, 34 to chassis-side communication components, and vice-versa. Communication signals 42 may be electrical, fiber-optic or both. Body-side communication components may include a human-vehicle interface 46, such as a steering wheel or a brake connected to a solenoid that translates a mechanical input force into an electrical communication signal. Other body-side communication components may include a body-side power distribution system 50 for distributing power to interior lighting, power doors, power windows, air conditioning, and other powered, body-side components, an entertainment system 54 and a control unit 58 which processes input from both chassis side and other body-side communication components.

Chassis-side communication components may include a chassis-side power distribution system 62, a steer-by-wire system 66, a brake-by-wire system 70, an electromechanical brake 74, which responds to communication signals 42 from the brake-by-wire system 70, traction system components 78 as well as a supervisor control 82 for monitoring and providing control of the above chassis-side communication components.

Figure 3:
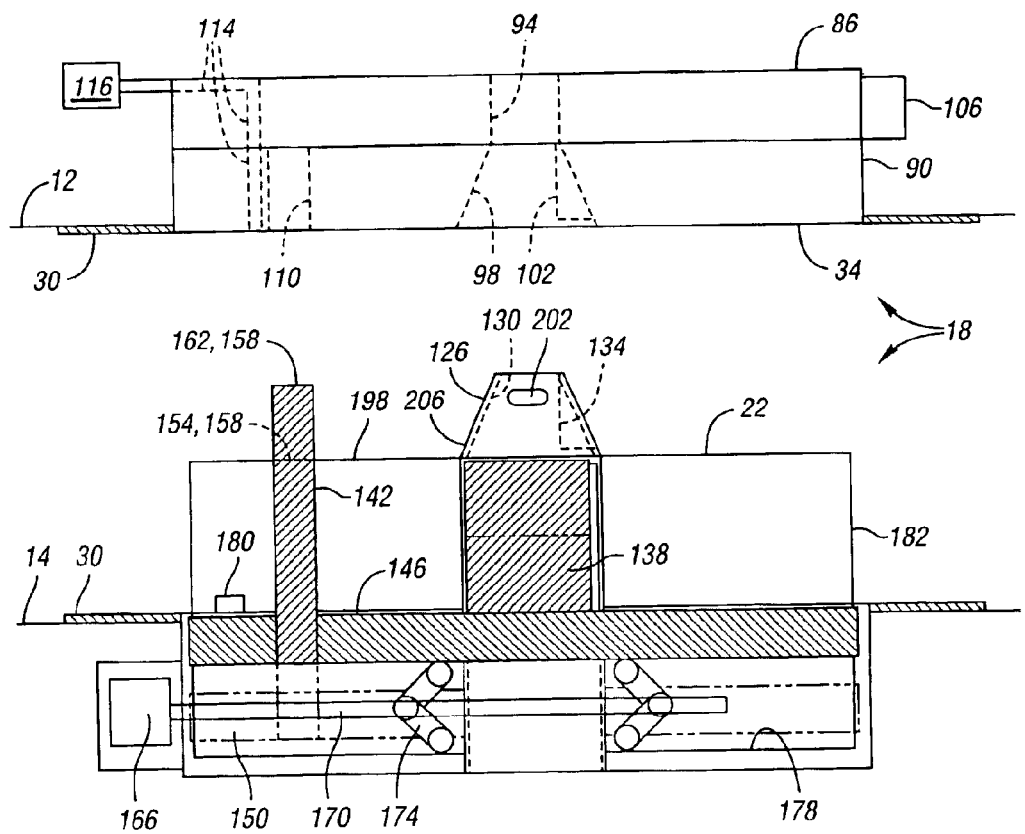
FIG. 3 is a schematic exploded side view of the first and second housings of FIGS. 1–2, including a first contact and a second contact.

Referring to FIG. 3, a more detailed illustration of the physical matability and electrical connectability of the first housing 22 with the second housing 34 is presented. The second housing 34 includes an upper section 86 and a lower section 90. An upper pass-through channel 94 is disposed generally through the second housing 34. The upper pass-through channel 94 has a flared section 98 in the lower section 90. A locking tab 102 extends from the upper section 86 into the flared section 98.

A rotational control 106 connected to the upper section 86 causes the upper section 86 to rotate about the upper pass-through channel 94 with respect to the lower section 90. A hollow pin receiver 110 is disposed through the lower section 90. An electrical connector 114 runs from a power source 116 located elsewhere on the vehicle through the upper section 86 and continues through the lower section 90.

Figure 4:
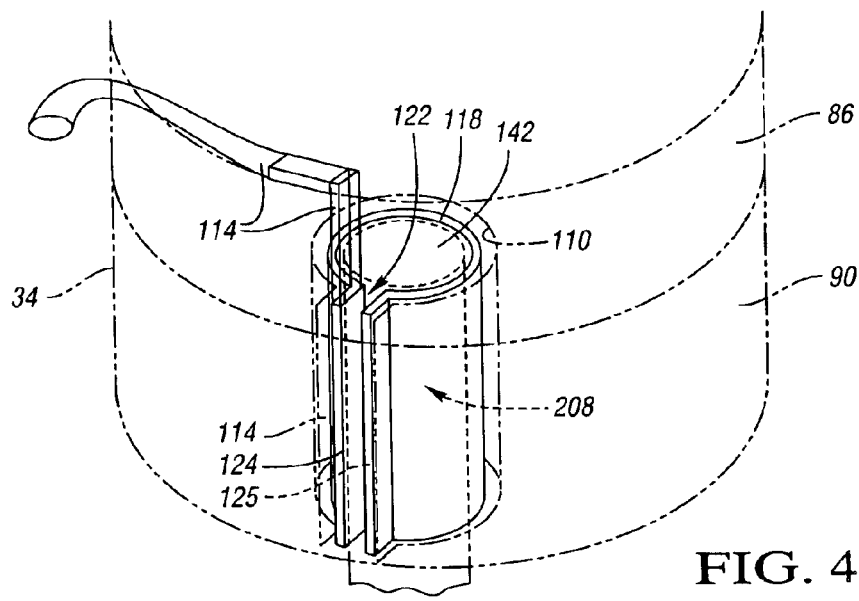
FIG. 4 is a fragmentary perspective schematic view, partially in phantom, of the second housing of FIGS. 1–3 with the first contact inserted therein.

Referring to FIG. 4, it may be seen that the electrical connector 114 abuts a gapped sleeve 118 disposed in the lower section 90 within the pin receiver 110 (shown in phantom). The gapped sleeve 118 is formed from a conductive material. A gap 122 in the gapped sleeve 118 separates opposing surfaces 124, 125 of the gapped sleeve 118. The electrical connector 114 and the gapped sleeve 118 may also be referred to as a second contact.

Referring again to FIG. 3, the first housing 22 is formed with a conical element 126. A lower pass-through channel 130 is longitudinally disposed through the conical element 126 and down through the first housing 22. A hollowed notch 134 is formed in a portion of the periphery of the conical element 126. A movable guide sleeve 138 disposed around the lower pass-through channel 130 slides within the housing 22. A pin 142, also referred to as a first contact, is rigidly mounted to a sleeve flange 146. The sleeve flange 146 also connects to the movable sleeve 138 and moves integrally therewith.

When the first housing 22 is mated with the second housing, the upper pass-through channel 94 and the lower pass-through channel 130 form a continuous channel through the connection assembly 18. Fluids, including liquids and gases (such as thermal air for air conditioning), may be routed between the body 12 and the chassis 14 via the pass-through channels 94, 130. The pass-through channels 94, 130 may be treated with a heat resistant and leak-free coating to accomplish such routing.

A transport mechanism 150 acts to move the movable sleeve 138, the flange 146 and the pin 142 as a unit from a lowered position (shown in phantom) to a lifted position (shown in solid), with the pin 142 moving from a retracted position 154 (shown in phantom), in which the distal end 158 of the pin 142 does not project beyond the housing 22 to a translated or inserted position 162 in which the distal end 158 projects beyond the housing 22. The transport mechanism 150 includes a motor 166, a worm gear 170 powered by the motor 166 and lift elements 174 connected to the worm gear 170. The worm gear 170 and the lift elements 174 are disposed beneath the sleeve flange 146 in a hollowed end cap 178, which is slidable along an outer circumference 182 of the housing 22. Preferably, there are four scissor jack-style lift elements 174 (two shown) spaced evenly about the lower pass-through channel 130 to provide an evenly distributed lifting force to the sleeve flange 146. Operation of the motor 166 causes the lift elements 174 to lift or lower the sleeve flange 146, the guide sleeve 138 and the pin 142. Those skilled in the art will recognize a variety of other mechanisms operable to translate the pin 142 such that it projects beyond the housing 22.

Preferably, a force sensor 180 is mounted to the sleeve flange 146 for sensing forces placed upon the pin 142 (and distributed down through the sleeve flange 146) during lifting of the pin 142. Those skilled in the art will recognize a variety of force sensor mechanisms able to sense forces on the pin 142 in this manner.

Figure 5:
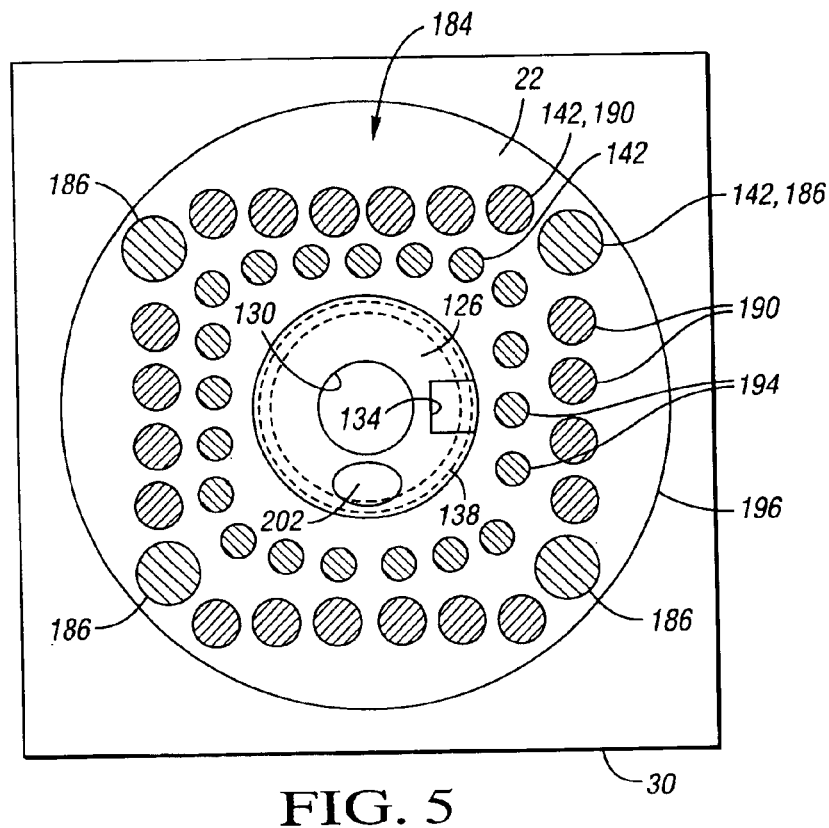
FIG. 5 is a schematic illustration in plan view of the first housing.

Referring to FIG. 5, a multitude of pins 142 (only one of which is depicted in FIG. 3) are disposed in the first housing 22 in a pin layout 184. The pins 142 include 42-volt system pins 186, preferably disposed at corners of the pin layout 184. Additionally, 12-volt system pins 190 are disposed between the 42-volt system pins 186 in ring-like fashion. Communication and network system pins 194 are disposed between the conical element 126 and the ring of 42-volt system pins 186 and 12-volt system pins 190. The pin layout 184 positions the larger 42-volt system pins at the outside corners to provide structural support and stability to the mated connector assembly 18, as will be readily understood by those skilled in the art. Additionally, placing the typically smaller voltage communication and network system pins 194 nearer to the center of the pin layout 184, such that the larger 42-volt system pins are disposed between the communication and network system pins 194 and an outer circumference 196 of the first housing 22, better protects the smaller pins 194 (and thus the communication and network systems) from potential electromagnetic interference from outside power sources (e.g., telephone lines and electrical transformers). The larger, higher voltage 42-volt system pins 186 are better able to withstand such interference, as will be readily understood by those skilled in the art. Some of the pins 142, including the communication and network system pins 194 may be configured for fiber optic communication between the body and the chassis.

Referring again to FIG. 3, when the body 12 is moved toward the chassis 14, the pin 142 is in the retracted position 154, not projecting beyond an upper surface 198 of the first housing 22. An alignment sensor 202 mounted on the conical element 126 senses the relative positions of the incoming flared section 98 and the conical element 126. Preferably, the alignment sensor 202 is a proximity sensor or an infrared sensor, as are known in the art. If the alignment sensor 202 is an infrared sensor, then a receiver sensor (not shown) would be mounted in the flared section 98. If the alignment sensor 202 detects a misalignment between the body 12 and the chassis 14, then an automated controller lowering the body would be signaled to lift and re-align the body. If the alignment sensor 202 detects alignment, then the body 12 is lowered toward the chassis such that the flared section 98 covers the conical section 126. When so aligned, the hollow notch 134 is a complementary receptacle for the locking tab 102, mating therewith, although not yet being locked thereto. Preferably, when all but the last few millimeters at a base 206 of the conical element 126 are covered by the flared section 98 (i.e., at about 70% of complete mating of the conical element 126 and the flared section 98) (complete mating being when the conical element 126 is completely covered by and coextensive with the flared section)) the alignment sensor 202 signals the transport mechanism 150 to begin to lift the pin 142 to the translated position 162. As the pin 142 lifts, it slides into the pin receiver 110 which is configured with a slightly larger diameter than the pin 142 so that the pin 142 reaches the translated position 162 surrounded by the pin receiver 110 without any insertion forces acting upon it. If an insertion force from the second housing 34 acts upon the pin 142 during lift, the force sensor 180 will signal the transport mechanism 150 to lower the pin 142 to the retracted position 154. The body 12 will then be automatically lifted from the chassis 14 and the alignment process will repeat.

Referring to FIG. 4, once the pin 142 (shown in phantom) is fully inserted into the pin receiver 110, because the pin receiver 110 and the gapped sleeve 118 are sized larger than the pin 142, no contact is yet made between the pin 142 and the gapped sleeve 118, preventing communication signals from flowing between the body 12 and the chassis 14 through the connector assembly 18 (shown in FIG. 3) at this stage.

Figure 6:
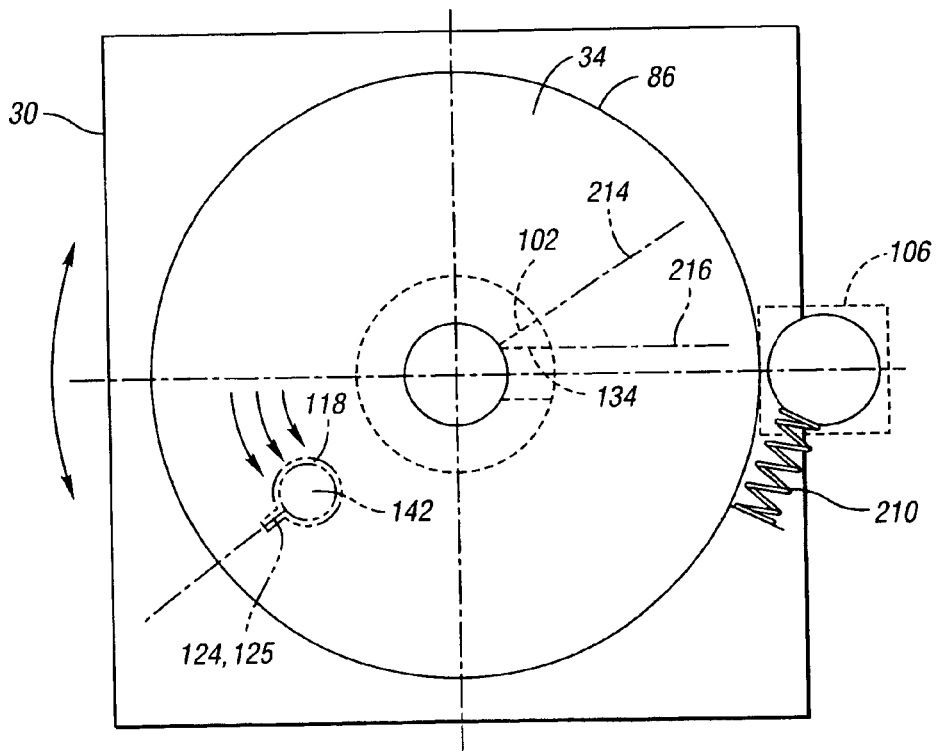
FIG. 6 is a schematic illustration in plan view of the second housing mated with the first housing, with a rotational mechanism engaging the first and second contacts.

Referring to FIG. 3, when the pin 142 reaches the translated position 162, the rotational control 106 causes the upper section 86 to rotate with respect to the lower section 90. Referring to FIG. 4, such rotation will cause the opposing surfaces 124, 125 to move towards one another, closing or at least narrowing the gap 122 and wrapping the gapped sleeve 118 around at least a portion of a pin circumference 208 of the pin 142, allowing communication signals to flow between the electrical connector 114 and the pin 142. Referring to FIG. 6, gapped sleeve 118 is shown wrapped around the pin 142 (both shown in phantom) after rotation of the upper section. The rotational control 106 may be activated by either a rotational or linear applied force. Rotation of the upper section 86 causes the locking tab 102 to lock into the hollow notch 134 and moves the upper section 86 from an unlocked position 216 to a locked position 214. (Alternatively, a separate locking mechanism (not shown) could be actuated separately from the rotation). A mechanical spring 210 may be used to bias the upper section 86 in the engaged, locked position 214, thus ensuring that engagement is maintained between the pin 142 and the gapped sleeve 118. Energy must then be applied to the rotational control 106 to move the upper section 86 back to the unlocked position 216.

Referring to FIG. 3, when the movement of the upper section 86 has completed, power from the power source 116 provides a "wake-up call" and, referring to FIG. 2, enables a diagnostic poll of communication signals 42 between body-side communication components and chassis-side communication components to be conducted to ensure completed connection of the assembly 18. Those skilled in the art will recognize the ability of the control unit 58 to accomplish such a poll.

As depicted in FIG. 2, each of the first and second housings 22, 34 is mounted at the flexible mounting flanges 30. The mounting flanges 30 may be integrally formed with the first and second housings 22, 34. The flexible mounting flanges 30, as well as the first and second housings 22, 34 are preferably formed from a molded rubber or plastic. The mounting flanges 30 permit movement of the mated housings 22, 34 relative to the body and the chassis, isolating the housings 22, 34 as well as the mated pin 142 and gapped sleeve 118 (shown in FIG. 4) from noise and other vibrations in the body 12 and the chassis 14, thus maximizing the integrity of the communication signals 42 between the body 12 and the chassis 14.

Figure 7:
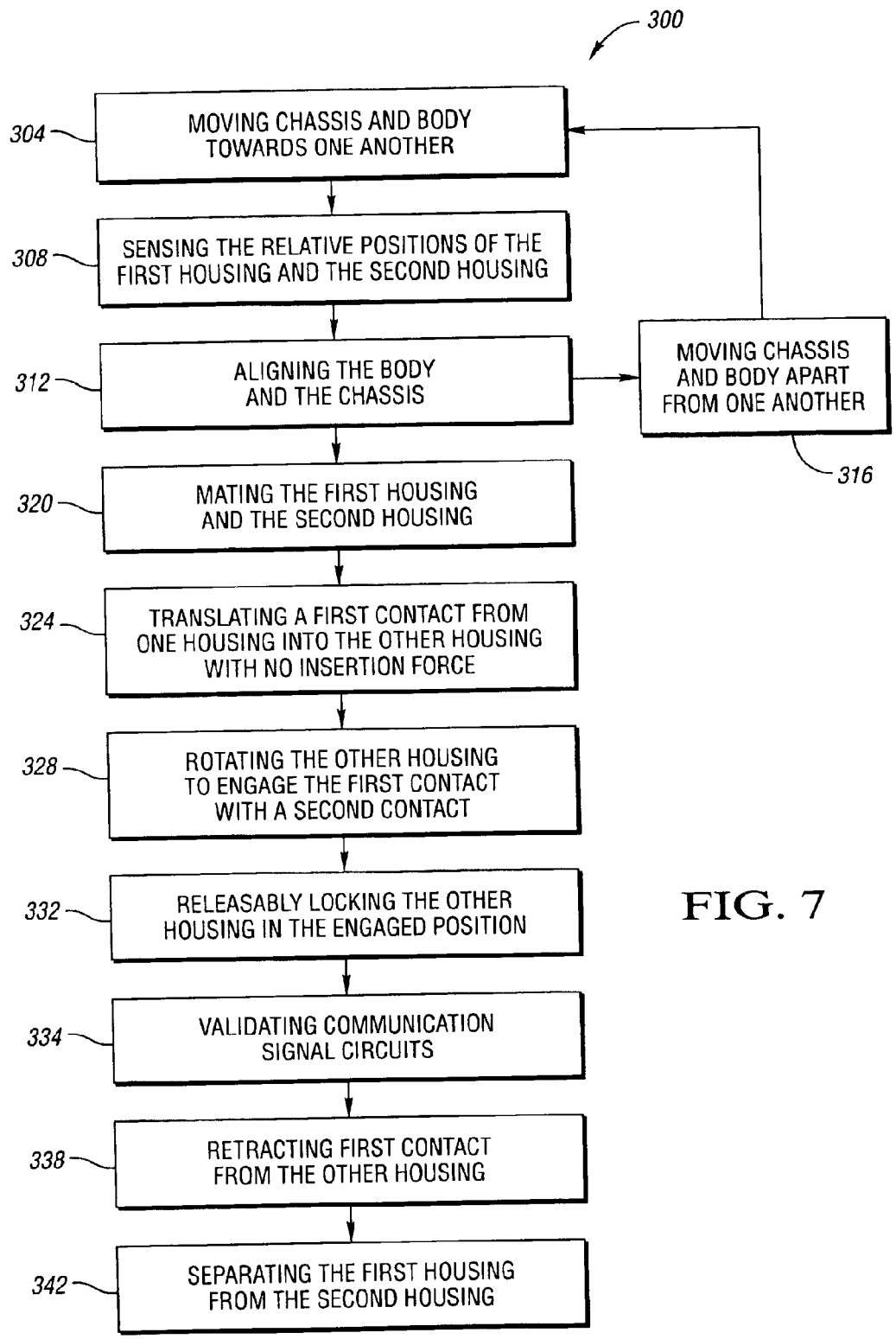
FIG. 7 is a flow diagram illustrating a method of communicating signals between a vehicle chassis and a matable vehicle body.

Referring to FIG. 7, a method 300 of communicating signals between a vehicle chassis having a first housing and a matable vehicle body having a second housing is illustrated. The method 300 includes moving at least one of the chassis and the body toward the other 304. The method 300 further includes sensing 308 the relative positions of the first housing and the second housing. Based upon such sensing 308, the method 300 further includes aligning 312 the body and the chassis with one another. Aligning 312 may include horizontal movement to reposition one or both of the body and the chassis. Moving the body and the chassis apart from one another 316 may be required to perfect alignment. If such moving 316 is necessary, moving the chassis and body toward one another 304, sensing the relative positions of the first housing and the second housing 308 and aligning the body and the chassis 312 will be repeated.

After successful aligning 312, mating 320 the first housing and the second housing to one another occurs. Translating 324 a first contact from one of the housings (e.g., the first housing) into the other of the housings (e.g., the second housing) with an absence of insertion force upon the first housing (as described above with respect to FIG. 4) then occurs. Rotating 328 the second housing to an engaged position in which the first and second contacts are operatively engaged with one another is carried out, thus communicating signals between the body and the chassis.

Releasably locking 332 the second housing in the engaged position may then be performed, thus securing the operative engagement of the first and second contacts. Releasably locking 332 may be automatically accomplished upon rotating 328, as with the locking tab 102 and the hollow notch 134, as discussed with respect to FIG. 6.

The method 300 may further include validating 334 communication signal circuits in the body and the chassis to ensure competent operative engagement of the first contact with the second contact. Validating 334 may be performed prior to or after releasably locking 332.

Finally, if it is desired to separate the body and the chassis from one another, the method 300 may further include retracting 338 the first contact from the second housing and, after said retracting 338, separating 342 the first housing from the other housing. By separating 342 after retracting 338, the first contact (i.e., the pin 142 shown in FIG. 4) will be protected from potential damage upon separating 342.

While the best mode for carrying out the invention has been described in detail, those familiar with the art to which this invention relates will recognize various alternative designs and embodiments for practicing the invention within the scope of the appended claims.

What is claimed is:

1. A connector assembly for communicating signals between a vehicle chassis and a matable vehicle body, the assembly comprising:
    a first housing mounted to one of the chassis and the body, the first housing having a first contact; and
    a second housing mounted to the other of the chassis and the body and matable with the first housing upon mating of the chassis and the body, the second housing having a second contact operatively engageable with the first contact for communicating the signals, and wherein the first contact is insertable into the second housing after substantial mating of the first and second housings with an absence of insertion force upon the first contact.

2. The connector assembly of claim 1, wherein the first and second contacts are not operatively engaged upon insertion of the first contact into the second housing.

3. The connector assembly of claim 1, further comprising a rotational mechanism, wherein a portion of one of the first and the second housings is rotatable to an engaged position by said rotation mechanism, and wherein the first and the second contacts are releaseably engaged for communicating the signals upon such rotation of said portion of one of the first and second housings to the engaged position.

4. The connector assembly of claim 3, wherein the rotational mechanism includes a locking feature for releasably locking said portion of one of the first and second housings in the engaged position.

5. The connector assembly of claim 1, wherein the first contact is a pin having a pin circumference, and wherein an operative engagement is between at least a portion of said pin circumference and said second contact.

6. The connector assembly of claim 1, further comprising:
    a transport mechanism operatively connected to the first contact for translatably inserting the first contact into and retracting the first contact from the second housing.

7. The connector assembly of claim 6, further comprising:
    a force sensor operatively connected to the transport mechanism for signaling the transport mechanism to retract the first contact from the second housing during insertion thereof upon sensing a predetermined amount of insertion force.

8. The connector assembly of claim 1, further comprising:
    an alignment mechanism operable between the first housing and the second housing for determining relative alignment of the first and the second housings for permitting mating of the first and second housings.

9. The connector assembly of claim 8, wherein the alignment mechanism includes a sensor selected from the group consisting of a proximity sensor and an infrared sensor.

10. The connector assembly of claim 8, wherein the alignment mechanism includes a mechanical tab disposed on one of the first housing and the second housing and matable with a complementary receptacle on the other of the first housing and the second housing.

11. The connector assembly of claim 1, wherein the first housing is formed with a first opening, and wherein the second housing is formed with a second opening matable with the first opening to form a pass-through for passing fluids between the body and the chassis.

12. The connector assembly of claim 1, further comprising:
    a first flexible mount for mounting the first housing to one of the chassis and the body; and
    a second flexible mount for mounting the second housing to the other of the chassis and the body;
    wherein the mated first and second housings are relatively movable with respect to the body and the chassis at the first and the second flexible mounts.

13. The connector assembly of claim 1, wherein substantial mating of the first and second housing is defined by 70%–100% of complete mating.

14. The connector assembly of claim 1, wherein the first housing has an outer circumference and a plurality of first contacts, wherein the first contacts are a plurality of pins, wherein the plurality of pins includes a first type of pins and a second type of pins, wherein the first type of pins are larger than the second type of pins, and wherein the first and second types of pins are relatively located with respect to one another such that the first type of pins are located between the outer circumference of the first housing and the second type of pins for providing structural support to the connector assembly and for shielding the second type of pins from electromagnetic interference.

15. A connector assembly for communicating signals between a vehicle chassis and a matable vehicle body, the assembly comprising:
    a first housing mounted to one of the chassis and the body, the first housing having a first contact;
    a second housing mounted to the other of the chassis and the body and matable with the first housing upon mating of the chassis and the body, and the second housing having a second contact operatively engageable with the first contact for communicating the signals, and wherein the first contact is insertable into the second housing after substantial mating of the first and second housings with an absence of insertion force upon the first contact, wherein the first and second contacts are not operatively engaged upon insertion of the first contact into the second housing;

a rotational mechanism, wherein a portion of one of the first and the second housings is rotatable to an engaged position by said rotation mechanism, and wherein the first and the second contacts are releaseably engaged for communicating the signals upon such rotation of said portion of one of the first and second housings to the engaged position, wherein the first contact is a pin and an operative engagement is by at least partial contact between the pin and the second housing.

16. A method of communicating signals between a vehicle chassis having a first housing and a matable vehicle body having a second housing matable with the first housing, the method comprising:

moving at least one of the chassis and body towards the other;

sensing the relative positions of the first housing and the second housing;

aligning the body and the chassis with one another based upon the sensed relative positions;

mating the first housing and the second housing with one another;

translating a first contact from one of the housings into the other of the housings, wherein said translating is characterized by an absence of insertion force upon the first contact; and rotating said other housing to an engaged position such that the first contact operatively engages with a second contact in said other housing, thereby communicating the signals between the body and the chassis.

17. The method of claim 16, further comprising:

releasably locking said other housing in the engaged position.

18. The method of claim 16, further comprising:

validating signaling communication circuits in the body and the chassis to ensure operative engagement of the first and second contacts with each other.

19. The method of claim 16, further comprising:

moving at least one of the chassis and the body apart from the other.

20. The method of claim 16, further comprising retracting the first contact from the other housing, and separating the first housing and the second housing from each other, wherein said retracting is done prior to said separating.

* * * * *